March 13, 1956  C. M. CALDWELL  2,737,797
POWER SUPPLY UNIT FOR PHOTOGRAPHIC FLASHLIGHTS
Filed Aug. 31, 1951
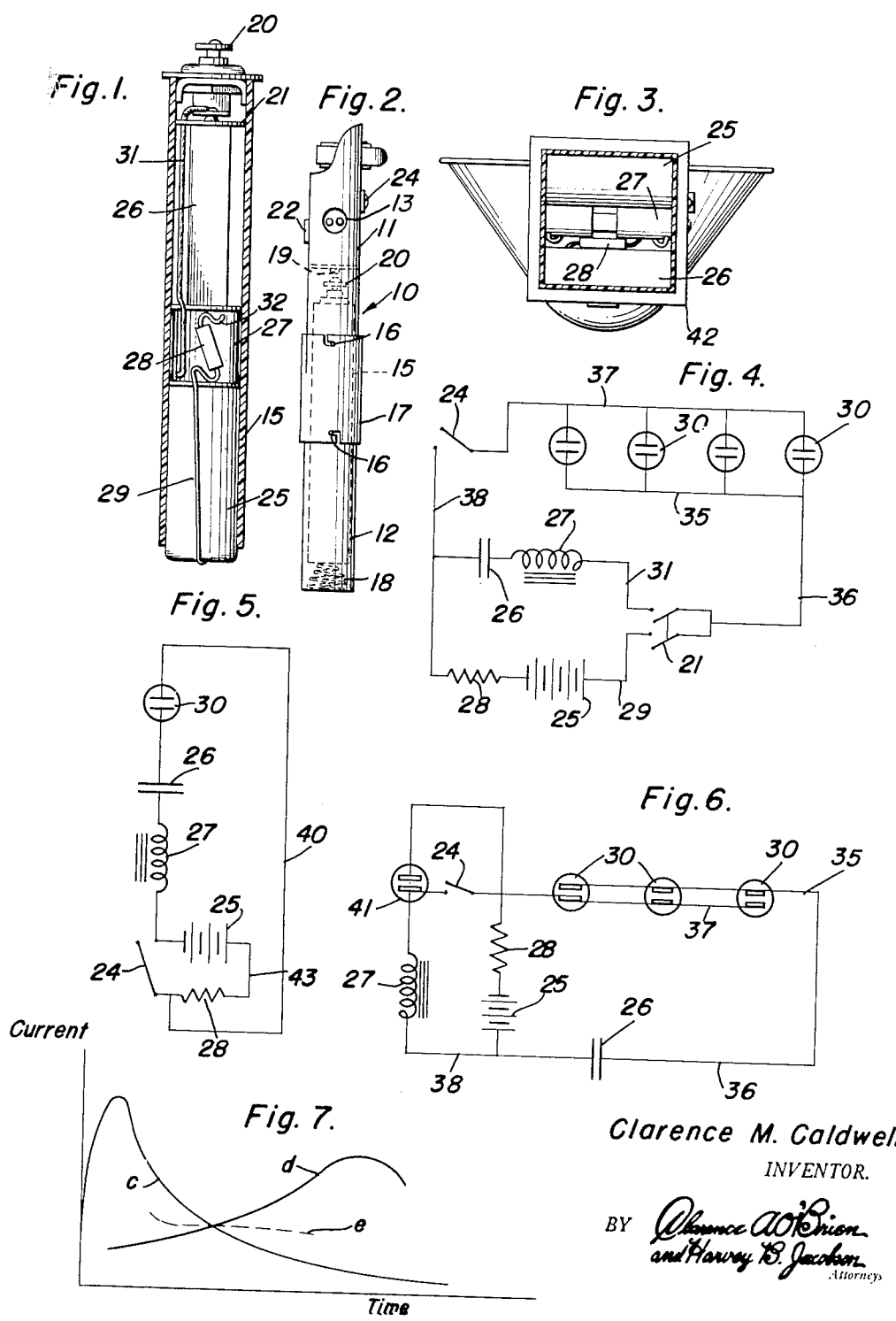
Clarence M. Caldwell
INVENTOR.

United States Patent Office 2,737,797
Patented Mar. 13, 1956

2,737,797

POWER SUPPLY UNIT FOR PHOTOGRAPHIC FLASHLIGHTS

Clarence M. Caldwell, Chevy Chase, Md.

Application August 31, 1951, Serial No. 244,564

7 Claims. (Cl. 67—31)

This invention relates to a power supply unit for camera flashlights using dry cells or other sources of D. C. current and it has for its main object to provide a power supply unit in the form of a package which occupies the space which the usual flashlight batteries occupy, but which permits to obtain a discharge of a nature which is superior to the discharge produced by dry cell batteries or by the usual battery-condenser aggregate and which operates at the same time with a high degree of economy so that the life of the battery which is used in the power supply unit according to the invention is greatly lengthened.

The power for supplying flashlights for photographic purposes was originally merely furnished by a number of battery cells connected in series, each cell being, for instance, capable of producing a voltage of 1½ volts. The amperage of the current in such an arrangement is obviously limited and therefore proved to be insufficient if a number of flashlights was used simultaneously or if the firing switch was operated by remote control over long wires. Moreover, the battery cells are rapidly exhausted by such an arrangement.

To eliminate or to reduce the defects of such an arrangement a condenser was introduced usually arranged in parallel to the cells of the battery, the said condenser being charged while the unit is at rest and being discharged when the operator closes the firing switch igniting the camera flashlights, the condenser acting in a limited way as a booster and also as a storage device.

The condenser had to be relatively large and moreover its introduction eliminates only some of the defects. As a leakage through a condenser is usually unavoidable the permanent connection of the battery with the condenser in parallel causes a permanent loss which exhausts the battery cells prematurely. The economy of the system is therefore not improved to the expected degree by the introduction of a condenser.

In order to further improve the economy of such a system it was found to be necessary to increase the voltage of the supply battery so that even if the battery became partially exhausted the remaining open circuit voltage would still be capable to charge the condenser sufficiently so that the charge could fire the flash bulbs.

This necessary increase of the battery voltage together with the well known exponential character of a condenser discharge which starts with a very high current value, dropping extremely rapidly towards a value asymptotically approaching zero produces at least two highly undesirable conditions.

In the first place the high voltage produces such an early firing of the flash bulb that the normal camera shutter synchronizer fails to open the camera shutter in time for taking a picture during the maximum light output of the flash bulb. While some camera shutter synchronizers permit some adjustments, a readjustment of the synchronizer for such extreme values is difficult, if not impossible, with most camera shutter constructions.

The second major drawback has been found in the experience that the higher voltage and the high current values produced during the condenser discharge frequently damage the synchronizer contact points irreparably and permanently. As this entails a major repair the use of a condenser in connection with a high voltage battery must be considered as an improvement of doubtful value.

The invention has for its principal object to avoid the above mentioned difficulties and to markedly improve the economy of the system without endangering the safety of the operation of the flash gun or of the camera cooperating with it.

To eliminate the above difficulties two main effects must be produced by the system according to the invention.

One of these effects consists in preventing any premature discharge of the battery through condenser leakage. This effect is obtained by so arranging the circuits that no charging of the condenser can take place before the insertion of a flash bulb.

As it is not always possible to arrange the circuits in this manner with all types of photographic flash guns the system may be so arranged, according to the invention, that no charging of the condenser can take place before the insertion of the power unit into the battery holder which usually immediately precedes the firing of the flash gun.

The second effect consists in the prevention of a premature current surge as a result of the condenser discharge following the closing of the firing switch. According to the invention an inductance of a suitable value is inserted in series with the condenser in the discharge circuit, the value of the said inductance being so chosen that the relatively slow build-up in the inductance counteracts and delays the rapid drop occurring during the condenser discharge so that a current flow results in the circuit which producses a flashing of the bulb with maximum light output at the time at which the synchronizer opens the camera shutter. The inductance moreover also modifies and attenuates the current flow during the discharge in such a manner as to exclude the damaging of the synchronizer contacts by the surge of current following the closure of the firing switch.

A further measure which is taken according to the invention to prevent a premature exhaustion of the battery due to the short circuiting of the battery by the firing switch or by the flash bulbs circuit during the time the switch is closed, consists in the arrangement of a resistance in series with the battery for limiting the current output of the battery.

According to the invention, therefore, the battery which is in series with a resistor limiting the current which may be drawn from the battery, is arranged either in series or in parallel with a condenser-inductance aggregate in a circuit which is only closed upon insertion of a flash bulb or upon closing of an additional switch automatically operated upon insertion of the power unit into the battery container of the flash gun. This condenser-inductance aggregate together with the battery-resistor aggregate and with the additional switch, if provided, forms a unit or package which is so assembled that it has exactly the shape of the ordinary battery package whereby it is possible to use the power supply package according to the invention in connection with any known camera flashlight bulb holder construction.

The combined aggregate produces a current which will neither rise too rapidly nor to an excessive value during the time which the circuit through the flash bulbs is closed. The electrical energy of the discharge on account of the inductance which is in series with the condenser is more evenly distributed, and the current shows therefore a more uniform flow. As the inductance builds up voltage relatively slowly while the condenser voltage drops, the combined action of both circuit elements results in an approximately constant or even current flow during the firing period of the flash bulb.

This equalization or flattening of the current curve has the main advantage that it will not only prevent damage to the contacts of the synchronizer but, in those cases in which a tripping solenoid is used, will also insure full and safe operation of the solenoid of the shutter tripping device, an operation which is not safely performed by a surge current with an extremely rapid drop.

As a rule the current supplied by the aggregate according to the invention maintains itself at an approximately constant value for the entire period during which the flash bulb circuit is closed by the operator so that no appreciable current is drawn from the battery during this period and moreover, any contribution which may be made by the battery is limited by the resistance in series with it to a value which is insignificant.

The more specific objects of the invention and several applications of the same having special advantages will be described in the following specification with reference to the accompanying drawings. It is however to be understood that the embodiments of the invention which are described and illustrated by way of example only, do not represent a complete survey of the possible embodiments of the invention and that a departure from the examples illustrated and described therefore does not necessarily involve a departure from the essence of the invention.

In the drawing:

Figure 1 is an elevational sectional view through the battery containing sleeve to be inserted into the holder of a flashlight unit, said sleeve being in this case a holder for the aggregates according to the invention.

Figure 2 is an elevational view of the flash bulb holder.

Figure 3 is a partly sectional plan view of another type of the flash bulb holder, the section being taken through the box holding the battery cells.

Figures 4, 5 and 6 are diagrams of the connections of the units of the aggregates suitable for different types of flash guns.

Figure 7 is a diagram showing the current plotted against time for a condenser discharge and the influence of an inductance.

The drawing, as stated, illustrates two currently used types of camera flashlight holders, one of said types being shown in Figures 1 and 2 and the other in Figure 3. The connections best suitable for the type of flashlight holder shown in Figures 1 and 2 is illustrated in Figure 4; however this diagram is not exclusively usable for flashlight holders of this type.

Figure 1 illustrates a power package according to the invention when inserted into a battery container of a well known type of a flash gun, the outer appearance of the said gun being illustrated in Figure 2.

Figure 2 shows a cylindrical housing 10 of the gun which also forms the handle by which the operator may hold the assembly, the said housing being subdivided into two sections 11 and 12 which may be separated from each other in order to be able to insert the battery container 15, indicated in dotted lines in Figure 2 and shown in Figure 1 on a larger scale. The two sections or halves 11, 12 of the housing 10 are held together by means of a sleeve 17 and by means of bayonet pins and slots 16 provided in the sleeve and in the two sections 11 and 12 respectively. The power unit is pressed upwardly by a spring 18. A firing switch 24 in the form of a push button closes the circuit producing the flash and operating the shutter of the camera. A small lamp socket 22 is provided for an indicator light and a plug 13 may be provided in order to connect that section of the equipment which is associated with the shutter mechanism with the firing circuits for the flash bulb or bulbs.

For instance, in some conventional arrangements the synchronizing solenoid of the camera shutter may be connected by means of the plug with the firing switch. In many flash guns moreover the button 24 may be removed and a plug (not shown) may be used in its place, which is connected with shutter contacts, closed when the operator presses the lever of the camera shutter.

The construction of the flash gun thus far described is well known as it belongs to one of the types which is extensively used. The further constructive details of this type of flash gun are without connection with this invention and are therefore not described.

Into the interior of the cylindrical housing the sleeve 15 with the power package is inserted. The power package according to the invention therefore occupies exactly the space which is usually occupied by the conventional dry cell battery power pack.

The package according to the invention consists of a battery cell 25, of the electrolytic condenser 26, of the inductance coil 27 and of the resistor 28, the last two elements being inserted between the two first mentioned elements so that the whole assembly may be easily held within the sleeve 15 which may be of plastic material, of pressed fiber or of any insulating rigid or stiff material. Preferably, also the connecting wires 29, 31, 32 are disposed within the shell 15. At the top of the package a double pole switch 21 is inserted consisting of mica or other insulating disks provided with contacts which are pressed against the contacts on the package when a button 20 is pressed downwardly. The button 20 is pressed downwardly by the pin 19 when the package is inserted into the sleeve.

The connections between the units or elements of the power package are diagrammatically shown in Figure 4. The reference letter 30 in the diagram indicates the holders or sockets for the flash bulbs of which there may be a plurality to be first simultaneously. All the sockets and bulbs are connected in parallel, and additional flash bulbs may be connected in series with one or all of the bulbs. The circuit of the flash bulbs comprises the conductor 35 connected with one contact of each of the sockets on one side and with the conductor 36 leading to the double pole switch 21 on the other side. The switch 21 corresponds to the switch having the same reference numeral in Figure 1. While the movable contacts of the double pole switch are connected with each other the fixed contacts of the said switch are connected with the two parallel circuits branches 29, 31 (corresponding to the wires 29 and 31 of Figure 1), one of said branches containing the battery 25 and the resistance 28 in series while the other branch contains the inductance 27 and the condenser 26 in series. The two branches are both joined to conductor 38 which leads to the firing switch 24. The latter is connected with conductor 37 which is joined to the second contact of the sockets 30.

As long as the power package is not inserted into the gun, the circuit of the condenser is not closed and is interrupted at the contacts of switch 21. Therefore, no leakage current between the plates of the condenser can pass, the circuit formed by the two branches 29 and 31 being open at the contacts of switch 21.

When the package is inserted into the housing the switch 21 is closed, and therefore the charging circuit for the condenser 26 is now completed over the connection between the two movable contacts of switch 21 and a current limited by the resistor 28 therefore flows from the battery 25, over the resistor 28 and to the inductance 27 to the condenser 26 so that the condenser will be charged.

When the firing switch 24 is pressed the condenser will discharge over the inductance 27, the discharge current being maintained at an approximately steady level for some time sufficient to flash the bulb and to operate the solenoid of the shutter synchronizing device, provided that a plug connection, such as shown in Figure 2 at 13, permits the inclusion of the said solenoid in the circuit.

From the diagram, Figure 7, it will be seen that the condenser discharge when not modified by other circuit elements and considered by itself will follow the curve $c$ while the current flow in the inductance coil is represented by the curve $d$. As the condenser discharges in a circuit containing the inductance a resultant discharge current builds up which is indicated by the curve $e$, showing that the discharge current follows an approximately even course for a time corresponding to the period of flashing.

Practically no discharge of the battery occurs during flashing as the voltage of the condenser-inductance discharge across the conductors 35, 37 is higher than that which the battery-resistance unit can produce, but if such discharge should occur as an exception it is in any case limited to a very short duration and to a limited value of the current by the resistance 28.

The battery, therefore, has only to charge the condenser and is not exposed to losses during the flashing or during the period of rest. The life time of the battery is therefore appreciably lengthened.

Moreover, the units which are used are smaller than those used in the conventional arrangement. A single battery cell is quite sufficient to produce a flash. In a specific example the battery was a dry cell battery of 30 volts (Everyready type 413) the capacity of the condenser was 500 μf. with 25 v. D. C. and a surge voltage of 40 v., the resistor was 2000 ohms with a rating of 1 w. and the inductance was approximately 1 henry while a typical battery-condenser equipment for the same flashlight calls for 3 battery cells and for a condenser of 2000 μf.

Figure 3 shows another well known type of a flash gun in which the power package is held within a small box 42 on the top of which the flash bulb socket and the reflector is mounted. The construction of this type of flash gun is based on the same principle which has been above described.

The power package according to the invention is again inserted into the box 42, that is into the same space into which the conventional three cell battery power pack is inserted.

The battery cell 25, the condenser 26, the inductance 27 and the resistor 28 are disposed in the box as shown in the figure.

The diagram of connections for this arrangement is illustrated in Figure 5, although it will be clear that also the diagram illustrated in Figure 4 may be used if desired. The condenser 26, and the inductance 27 are again in series and both are in series with the battery cell 25 and resistor 28 on one side and with the socket 30 for the flash bulb on the other side. The battery cell and resistor are arranged in a branch circuit 43 which is short circuited by the firing switch 24 when the latter is closed. It will be noted that with this arrangement, as long as the flash bulb is not inserted into the socket, the circuit 40 of the condenser is open. When the flash bulb is mounted the charging circuit 40 for the condenser is closed with the resistance 28 limiting the charging current which passes through the induction coil 27 to the condenser 26.

When the firing switch 24 is operated, a discharge circuit, short circuiting the branch 43 containing the battery and resistance, is closed by the switch 24 and the discharge of the condenser occurs through the inductance 27 and the flash bulb inserted at 30 over the conducting circuit 40.

At the same time the battery cell 25 and the resistor 28 are now in a closed short circuit 43, but on account of the high value of the resistance the current flowing in this circuit 43 is limited and is reduced to a value which will not seriously drain the battery, especially as the short circuit over 43 lasts only for the time during which the button of the firing switch is pressed which is usually less than one-half second. Therefore, the advantage of this arrangement over an arrangement of conventional nature is still marked.

Another system of connections suitable for an arrangement very similar to that shown in Figure 1 is illustrated in Figure 6. This particular mode of making the connections has the advantage that the charging circuit of the condenser includes the flash bulbs in such a manner that this circuit is always open and is not closed until a flash bulb has been inserted. In addition the charging circuit of the condenser does not contain the inductance which is only included in the discharge circuit and therefore the charging of the condenser is not retarded by the inductance.

As will be seen the condenser 26 is arranged in the common branch 36 which is connected with one of the socket leads 35 on one side and with a circuit 38 having two parallel branches containing the battery cell 25 and resistor 28 on one hand, and the inductance coil 27 respectively on the other hand. The firing switch 24 is in this case inserted between the two last named branches. The charging circuit of the condenser 26 is thus formed by conductor 36, and conductor 35, and by the branch containing the battery 25, and the resistor 28 and finally by conductor 37 connected with the contacts of the flash bulb sockets.

No appreciable current flows after the condenser has been charged. As the condenser is only charged upon insertion of a flash bulb immediately before the firing of the flash gun the time is too short to cause a serious loss by leakage currents through the condenser. Moreover, also any leakage currents would be limited by the resistor 28.

The closing of the firing switch 24 produces a discharge over a discharge path which leads from the condenser 26 over conductor 36, conductor 35, the flash bulb inserted between conductor 35 and conductor 37, the firing switch 24 and the inductance 27 back to condenser 26 over conductor 38. This discharge path for the condenser does not include the resistance 28 or the battery 25. The battery is again included in a closed local circuit with the resistor during the pressing of the button operating the firing switch 24, the battery current in this case flowing over inductance 27, firing switch 24, resistance 28. The resistance again limits the current in this circuit.

It will thus be seen that the above described system provides means for preventing a drainage of the battery by currents which do not solely serve the purpose of charging the condenser and of providing a source of energy for the igniting of the flash bulbs and further means for protecting the elements of the flash gun and especially the contacts of the synchronizing shutter mechanism against the current surge which occurs upon discharging the condenser. The invention permits therefore the use of high voltage battery cells which is of great advantage for the user, as it reduces the size and weight of the cells and improves the economy of the operation by making it possible to use the cells for a protracted period, when they are already in a state of partial exhaustion. Moreover the invention produces a better synchronization between the operation of the shutter and of the period of maximum light emission of the flash bulb, preventing a premature flashing which frequently occurs with guns operated on battery-condenser units. Moreover the invention permits the use of an operative current which is more suitable for the safe operation of a solenoid for the synchronizing shutter tripping device than the current produced by battery-condenser units hitherto used.

It will be clear that a number of non-essential changes may be made in the connections and in the general arrangement without in any way departing from the essence of the invention as defined by the subjoined claims.

Having described the invention, what is claimed as new is:

1. A power supply unit for photographic flash guns comprising a flash bulb socket for holding a flash bulb provided with two socket contacts, a battery cell, a resistor arranged in series with said battery cell, a condenser chargeable by the battery cell, a firing circuit including said condenser, a firing switch and the flash bulb socket in series, a charging circuit branch for the condenser arranged in parallel to a section of the firing circuit, and containing said battery and said resistance, and an inductance in the firing circuit in series with the condenser and the firing switch, said inductance, upon closure of the firing switch, leveling the surge current produced by the condenser discharge in the firing circuit and keeping the discharge current at an approximately even value during the condenser discharge.

2. A power supply unit for photographic flash guns as claimed in claim 1 wherein the section of the firing circuit to which the condenser charging circuit branch is in parallel contains the inductance.

3. A power supply unit for photographic flash guns as claimed in claim 1 wherein the charging circuit for the condenser, containing the battery cell and the resistance is arranged in parallel to a section of the firing circuit containing the firing switch.

4. A power supply unit for photographic flash guns as claimed in claim 1 wherein the charging circuit for the condenser, containing the battery cell and resistance, is arranged in parallel to a section of the firing circuit containing the firing switch and the inductance.

5. A power supply unit for photographic flash guns as claimed in claim 1 wherein the charging circuit for the condenser, containing the battery cell and the resistance in series, is arranged in parallel to a section of the firing circuit containing the condenser, the inductance and the firing switch.

6. A power supply unit for photographic flash guns as claimed in claim 1 wherein the charging circuit for the condenser, containing the battery cell and the resistance in series, is connected with one arm of a double pole switch, the other arm of which is connected with the section of the firing circuit to which said charging circuit is arranged in parallel, and which contains the condenser and the inductance in series, the two arms of the double pole switch being joined and connected with a section of the firing circuit connected with one of the contacts of the flash bulb socket, while the other contact of the flash bulb socket is connected with the aforesaid section of the firing circuit, containing the condenser and the inductance in series, by means of a further section of the firing circuit containing the firing switch.

7. A power supply system for photographic flash guns as claimed in claim 6, comprising in addition a power unit container for holding a power unit insertable into said container, the unit including the condenser, the inductance, the battery and the resistor, the double pole switch being arranged within the container and having a movable contact, closed upon insertion of the power unit into the container, and connecting the battery cell containing, condenser charging branch with the said condenser, thus completing the charging circuit of the condenser.

References Cited in the file of this patent
UNITED STATES PATENTS

| | | |
|---|---|---|
| 2,324,075 | Gillon | July 13, 1943 |
| 2,546,734 | Farber | Mar. 27, 1951 |
| 2,553,662 | Marsal | May 22, 1951 |
| 2,584,858 | Fritz | Feb. 5, 1952 |
| 2,590,069 | Robinson | Mar. 18, 1952 |
| 2,646,672 | Fairbank | July 28, 1953 |
| 2,664,795 | Tone | Jan. 5, 1954 |